United States Patent Office 3,743,711
Patented July 3, 1973

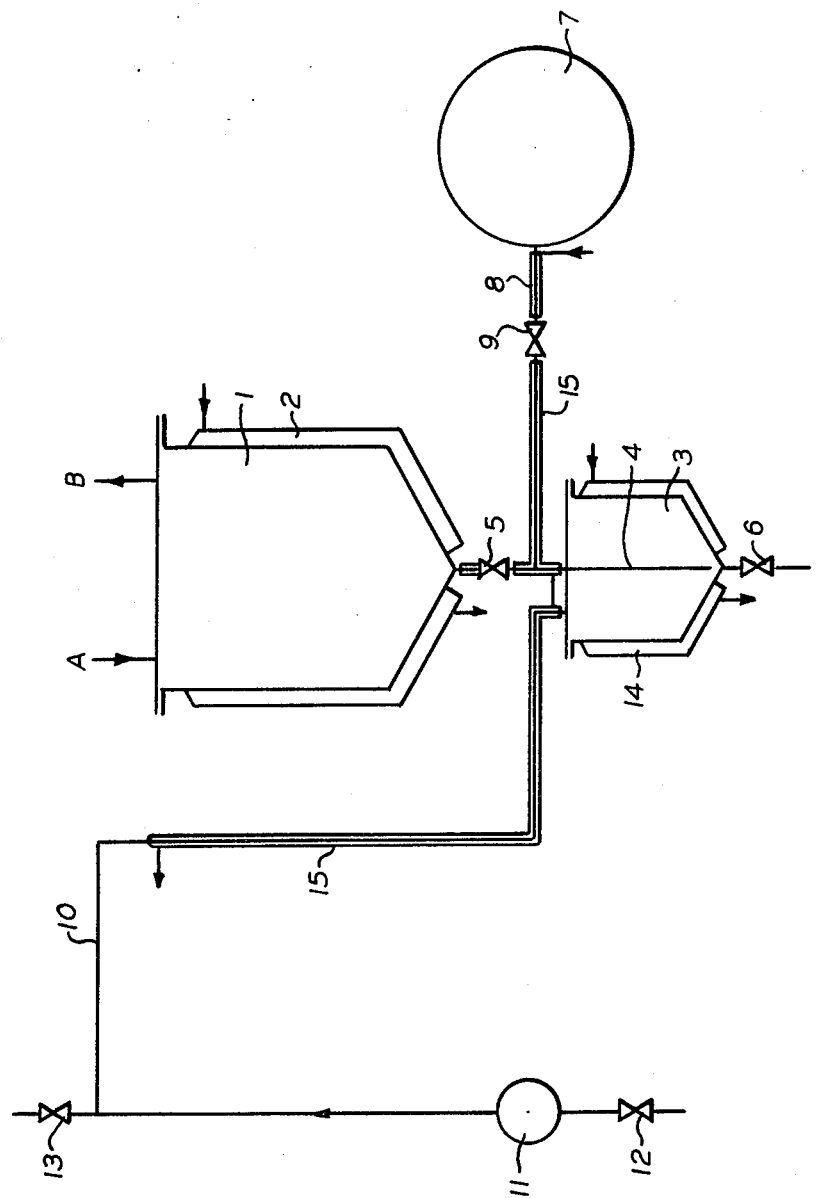

3,743,711
PROCESS FOR DOSING ALKALI AND ALKALINE EARTH METALS
Walter Rogler, Bonn, Arnold Lenz, Cologne-Stammheim, and Wilhelm Joch, Niederkassel, Germany, assignors to Dynamit Nobel Aktiengesellschaft, Troisdorf, Germany
Filed June 15, 1970, Ser. No. 46,511
Claims priority, application Germany, Sept. 3, 1969, P 19 44 601.6
Int. Cl. C01b 6/04; B01j 4/00
U.S. Cl. 423—646    3 Claims

ABSTRACT OF THE DISCLOSURE

Alkali or alkaline earth metals used in the preparation of their powder form hydrides through reaction of such metal with hydrogen are introduced in dosed form into a reaction vessel in molten form by means of a flowing pressurizing agent comprising a gaseous medium, e.g., nitrogen or argon.

---

This invention relates to a process for the dosed forwarding of alkali or alkaline earth metals from a dosing container into a reaction vessel in the manufacture of the powder form hydride of such metal by reaction of the metal with hydrogen.

It is known to obtain alkali metal hydride in a powdery form by direct reaction of hydrogen with the appropriate molten alkali metal. In such a process the fluid alkali metal is advantageously maintained in a finely divided form in the reaction vessel by means of a powdery or grainy, etc. inert carrier material; the fluid alkali metal is constantly agitated to permit the conversion of the highest possible amount of metal to the corresponding hydride in a given unit of time. It is particularly advantageous to use, as such a carrier material, an alkali metal hydride in powder form and to so dose the amount of molten alkali metal continuously introduced into the reaction vessel that this alkali metal reacts completely with hydrogen, also continuously introduced, and that no molten alkali metal accumulates at the bottom of the reaction vessel.

However, the forwarding of precise doses or dosage rates of molten alkali metal into the reaction vessel is subject to severe difficulties. For instance, if a centrifugal rotary or gear pump is used for such forwarding, there is the danger of losing small amounts of the molten alkali metal through bushings and other places in such equipment that cannot be entirely sealed with respect to the molten alkali metal. The molten alkali metal which can seep out from such apparatus is often, especially in view of the high temperatures used, the cause of plant fires. If instead of the above equipment, membrane pumps are used which do not contain bushings and other parts subject to permitting seepage of the alkali metal, another difficulty arises and this is that the valves of such pumps frequently plug as a result of the inevitable presence of very small amounts of oxidized impurities in the molten metal; accordingly, a precise dose forwarding of molten metal to the reaction vessel is thus not possible for extended periods of time in commercial operation. Because the molten metals, due of their high surface tension, cannot be passed through suitable filters without using pressure, that is without the means of pumps, it is not possible to separate these small oxidative impurities by filtration. In addition to the above described drawbacks of conventional forwarding techniques, it is often impossible to dose the amount of molten alkali metal with the required precision. This is caused again by small oxidative impurities which disturb the free movement of a float frequently used in a flow meter for volume measuring purposes, e.g., in a rotometer. The magnetically activated indication of the position of the float in the flow meter thus no longer corresponds exactly to the actual flow-through of the molten metal. To obviate the various disadvantages inherent in these prior art forwarding techniques, it has been attempted to push the molten metal from a dosing container into the reaction vessel by means of a pressurizing medium composed of paraffin oil. However, it was found that the paraffin oil and the alkali metal mixed with each other to a certain extent so that this mixture had to be retained in the dosing container to avoid introducing impurities into the reaction vessel. Apart from the fact that costly procedures were required to separate the alkali metal from this impure mixture in a suitable degree of purity, there is the danger that pure paraffin oil may reach the reaction vessel to not only deleteriously affect the reaction but to contaminate the reaction product itself. Accordingly, the use of paraffin oil as a pressurizing medium has not proven satisfactory.

It has now been found that the significant disadvantages of the prior art processes can be mitigated or obviated by use of the process of this invention.

Essentially, the process of this invention comprises the use of a pressurizing medium in gaseous form such as nitrogen or argon in forwarding molten alkali metal from a dosage vessel to the reaction vessel. It is possible, by use of this process, to forward precise amounts of alkali or alkaline earth metal to the reaction vessel per unit of time. In the process the amount of pressurizing gas introduced into the dosing container is measured and adjusted by means of a suitable gas pressure regulating valve, which is calibrated to the particular process equipment and conditions. Implementation of the invention makes it possible to so construct the entire process equipment apparatus to eliminate seepage of gas from such equipment. In addition, the possibility of escape of some presurizing gas from the dosing vessel into the reaction vessel after the molten metal has been pushed into the reaction vessel is not particularly dangerous because the quality of the reaction product is not deleteriously affected. However, to eliminate such a possibility, in order to avoid any possible contamination of the hydrogen phase in the reaction vessel which may slow the formation of hydride, it is contemplated in a preferred embodiment of this invention, to use as the pressurizing means the reaction gas itself, that is hydrogen. It has been found in practice that, contrary to expectation, so little hydride formation takes place in the dosing container and in the lines connecting that container to the reaction vessel that there is no adverse effect on completely satisfactory functioning of the process. The formation of a very fine hydride "skin" can be further reduced by selecting the temperature at which the molten reactant metal is processed, so that it is just high enough to result in a suitable flowable metal, e.g., 120 to 150° C. in the case of sodium. In this way the possibility of any contamination of the process equipment, even with inert matter, is obviated so that neither the course of the reaction nor the reaction product is deleteriously affected.

In the process of this invention it is not critical to precisely interrupt the forwarding process after the last bit of molten metal has been pushed into the reaction vessel because the only consequence of failing to make such an interruption precisely is that additional hydrogen is introduced into the reaction vessel and this additional in-flow of hydrogen will terminate by itself because of the pressure developed in the reaction vessel. Another advantage of this preferred embodiment of the invention is that two separate gases are no longer required for hydride formation, but only one gas, namely the reaction gas hydrogen, whereby the whole process can be conducted more economically on a practical scale.

The process of the invention and a particular embodiment thereof can be more fully understood by reference to the appended drawing which represents a schematic flow sheet thereof.

With reference to the drawing, vessel 1 is used for melting the alkali or alkaline earth metal under the protective atmosphere of a gas. As such a protective there can be used dry nitrogen but also hydrogen. The container 1 is constantly flushed with the protective gas which flows in at point A and flows out at point B. If the temperature of the melt (e.g., 120 to 150° C. in the case of sodium) permits, it is possible to use dry air as the protective gas.

The heating means used to heat vessel 1 depends on the temperature needed to melt the metal which can reach about 800° C. and higher in the case of alkaline earth metals and can be hot oil or electrical heating means. The heating means shown in the drawing is indicated as heating mantle 2 surrounding melt vessel 1. Alternatively it is, of course, possible to provide a heating means within the melt vessel 1. Melt container 1 is connected with dosing container 3 disposed below container 1 by pipe 4 which extends into dosage container 3 and terminates near the bottom thereof. Locking valve 5 permits interruption of flow through line 4 into the dosing container. At the bottom of dosing container 3 there is provided an outlet valve 6 for cleaning purposes. Pipe 4 is connected at a point downstream from valve 5 but upstream from the dosing container 3 with a pipe means 8 fitted with valve 9 which leads to the reaction vessel 7. Pipe 10 which is connected to the dosing container 3 serves to convey the pressurizing gas which is introduced through the regulating valve 12 and the flow meter apparatus 11 from a suitable pressurizing gas source (not shown). In addition, pipe 10 is fitted at a point above the top of melt container 1 with an escape valve 13 which provides for escape of gas to the atmosphere. Escape valve 13 can be in the form of a check valve or other valve means which prevent the introduction of atmospheric air into pipe 10.

Before the molten metal is forwarded through pipe 4 into the dosing container 3, this container and pipes 4, 8 and 10 are flushed with nitrogen, hydrogen or the like. Subsequently valve 9 is closed and valve 5 and escape valve 13 are opened so that the molten metal can flow into dosing container 3 and fill this container as well as the connecting pipes until equilibrium is reached between the molten metal in container 1 and that contained in line 10. Escape valve 13 through which the gas displaced by the molten metal has escaped is then closed along with valve 5 and the regulating valve 12 is then so set that the desired requisite gas pressure is obtained in pipe 10 for the desired amount of reactant forwarding. When valve 9 is opened the molten metal is led to the reaction vessel 7 in the desired amounts which can be smoothly controlled from zero flow. The amount of material in dosing container 3 is chosen, taking into account the amount of molten metal in the pipes, to be just so high that this amount corresponds to one charge of metal hydride formed so that the dosing container 3 is filled in the same cycle during which the reaction vessel 7 is emptied. The amount of material in melt container 1, however, is chosen to be somewhat higher than such a product charge so that after filling of dosing container 3 and the pipes sufficient molten metal remains in container 1 to improve heat transfer in melting the solid metal introduced in the next feed charge. Once the dosage is adjusted by means of regulating valve 12 the entire apparatus can be left to operate independently because the process in effect terminates itself after the reactants are delivered as described above. To obviate cooling of the molten metal in dosing container 3 as well as in the pipes and valves and to obviate the possibility of the solidification of the metal at these places, various parts of the equipment are equipped with heating means, such as mantles 14 and 15, to the extent that they come into contact with the molten metal. It is sometimes advantageous to heat the molten metal already prior to entry into the reaction vessel 7 which is separately heated by heating means not shown.

The choice of the reaction temperature, as well as of the reaction pressure, depends on particular conditions needed in individual cases. Generally, the formation of the hydrides of alkali or alkaline earth metals is possible at a temperature between the melting point of such metals and the temperature at which the hydrides decompose thermally. The lower limit for the hydrogen pressure in the reaction vessel is determined by the hydrogen partial pressure of the particular hydride being formed whereas the upper limit on the reaction pressure is limited only by the cost of very high pressure apparatus. As a typical example it has been found efficient to operate, in the formation of sodium hydride at a temperature from 290 to 300° C. and at a pressure of about 4 atmospheres (gauge).

It will be understood that the foregoing example has been given only by way of illustration and is not to be deemed unduly limitative of this invention, of which various embodiments will suggest themselves to those skilled in the art.

What is claimed is:

1. In a process for the continuous production of sodium hydride by the reaction of the metal, in molten form, with hydrogen in a reaction vessel, the improvement which consists essentially of forwarding the molten metal to the reaction vessel from a dosing container communicating therewith and containing said molten metal, maintained at a temperature of about 120° to about 150° C., by introducing into such dosing container pressurized hydrogen to displace molten metal from said dosing container into said reaction vessel, and adjusting the supply of said pressurized hydrogen to closely determine and control the desired dosing of molten metal to the reaction vessel.

2. Process as claimed in claim 1 wherein the reaction temperature is about 300° C.

3. Process as claimed in claim 1 wherein the hydrogen pressurizing medium is so introduced to the dosing container that there is substantially no communication between the hydrogen pressurizing medium and the reaction vessel without intervening molten metal being present during continuous operation of the process.

References Cited
UNITED STATES PATENTS

| | | | |
|---|---|---|---|
| 2,474,021 | 6/1949 | Vining | 23—204 R |
| 2,405,580 | 8/1946 | Jackson | 23—184 |

OTHER REFERENCES

Sittig: "Sodium," 1956, pages 97–98, 132.

MILTON WEISSMAN, Primary Examiner

U.S. Cl. X.R.

423—647, 659; 137—334